United States Patent
Athmanathan et al.

(10) Patent No.: US 11,138,040 B2
(45) Date of Patent: Oct. 5, 2021

(54) DATABASE PROCESS CATEGORIZATION

(71) Applicant: ORACLE INTERNATIONAL CORPORATION, Redwood Shores, CA (US)

(72) Inventors: Ramasubramanian Athmanathan, Chennai (IN); Sanjay Amichand Singh, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 144 days.

(21) Appl. No.: 16/352,158

(22) Filed: Mar. 13, 2019

(65) Prior Publication Data
US 2020/0293376 A1  Sep. 17, 2020

(51) Int. Cl.
| | | |
|---|---|---|
| G06F 9/44 | (2018.01) | |
| G06F 9/50 | (2006.01) | |
| G06F 9/54 | (2006.01) | |
| G06F 16/188 | (2019.01) | |
| G06F 11/34 | (2006.01) | |
| G06F 11/30 | (2006.01) | |

(52) U.S. Cl.
CPC ............ *G06F 9/5022* (2013.01); *G06F 9/542* (2013.01); *G06F 9/545* (2013.01); *G06F 11/302* (2013.01); *G06F 11/3082* (2013.01); *G06F 11/3452* (2013.01); *G06F 11/3476* (2013.01); *G06F 16/192* (2019.01)

(58) Field of Classification Search
CPC ........................................................ G06F 9/44
See application file for complete search history.

(56) References Cited

U.S. PATENT DOCUMENTS

| | | | | |
|---|---|---|---|---|
| 7,702,779 | B1 * | 4/2010 | Gupta | G06F 9/50 709/224 |
| 2003/0037171 | A1 * | 2/2003 | Madineni | G06F 9/545 719/310 |
| 2005/0251548 | A1 * | 11/2005 | Hayashi | G06F 13/385 709/200 |
| 2006/0112395 | A1 * | 5/2006 | Cox | G06F 9/485 719/310 |
| 2011/0252073 | A1 * | 10/2011 | Pauly | G06F 16/13 707/812 |
| 2011/0295804 | A1 * | 12/2011 | Erofeev | G06F 11/1435 707/634 |
| 2012/0221768 | A1 * | 8/2012 | Bagal | G06F 12/084 711/103 |
| 2012/0254435 | A1 * | 10/2012 | Zhaofu | G06F 16/20 709/226 |

OTHER PUBLICATIONS

Manoj ("chroot, cgroups and namespaces—An overview") published on May 1, 2018 (Year: 2018).*

(Continued)

*Primary Examiner* — Jae U Jeon
(74) *Attorney, Agent, or Firm* — Vista IP Law Group, LLP

(57) ABSTRACT

Described is a system, method, and computer program product to perform monitoring for process-based OS resource utilization by individual database instances in a multi-database environment. This approach may be used to resolve numerous resource allocation and monitoring problems, such as the noisy neighbor problem.

26 Claims, 13 Drawing Sheets

(56) References Cited

OTHER PUBLICATIONS

Kerrisk, M., "netlink—communication between kernel and user space (AF_NETLINK)", NETLINK(7), Linux Programmer's Manual, (Mar. 6, 2019).

Chan, I. et al., "Managing Operating System Resources", Oracle Database Performance Tuning Guide, 11g Release 2 (11.2), (Apr. 2011).

Chan, I. et al., "Understanding Operating System Resources", Oracle database—Performance Tuning Guide 10g Release 2 Version 10.2, (Mar. 2008).

Fogel, S. et al., "Managing Resources with Oracle Database Resource Manager", Oracle Database Administrators Guide, 11g Release 2 (11.2), (May 2015).

Aws, "DB instance classes", Amazon Relational Database Service User Guide, (Oct. 31, 2014).

Ghanayem, M. et al., "SQL Server Agent", Microsoft SQL Docs Version SQL Server 2017, (Jan. 19, 2017), from https://does.microsoft.com/en-us/sql/ssms/agent/sql-server-agent?view=sql-server-2017.

Guyer, C. et al.,"sys.dm_os_sys_info (Transact-SQL)", Microsoft SQL Docs Version SQL Server 2017, from https://does.microsoft.com/en-us/sql/relational-databases/system-dynamic-management-views/sys-dm-os-sys-info-transact-sql?view=sql-server-2017.

Layher, M., "Linux, Netlink, and Go—Part 1: netlink", Published in Medium, (Feb. 21, 2017).

Kaichuan, K. H., "Kernel Korner—Why and How to Use Netlink Socket", Linux Journal, (Jan. 5, 2005).

Koutoupis, P., "Everything You Need to Know about Linux Containers, Part I: Linux Control Groups and Process Isolation", Linux Journal, (Aug. 21, 2018).

Kerrisk, M., "Cgroups—Linux Control Groups", CGROUPS(7), Linux Programmer's Manual, (Feb. 2, 2018).

\* cited by examiner

DATABASE PROCESS CATEGORIZATION

BACKGROUND

An operating system (OS) is software that is used to manage the hardware and software on a computing system. The OS performs numerous necessary operations within the computer to allow programs on the system to properly operate and to control and interoperate with the hardware components and devices on the system, such as the memory, persistent storage, I/O devices, and/or communications devices.

In the computing system, a "process" is an instance of a computer program that is executed by the system. The instantiation and execution of the process is controlled and tracked by the OS. In general, a computer program is considered the set of code/instructions that form the program, while its corresponding process is considered the in-flight execution of those instructions. Each process within the system consumes a given amount of computing resources during its execution. Such resources may include, for example, memory resources, CPU resources, I/O resources, and/or utilization of other devices.

One problem that is faced by administrators of computing systems is that the competition for resources may cause a first process that is currently consuming excessive resources to create a problem for a second process that is now starved of resources it needs to perform its functionality. This is often visible as a "noisy neighbor" problem, where one process monopolizes resources in the computing infrastructure to such an extent that it negatively affects the performance of another process.

To address problems such as the noisy neighbor problem, an administrator must be able to knowledgeably correlate the running processes in the system to specific programs or tools that are running in the system. However, such correlation is made extremely difficult by the obscure way in which processes are identified within the computing system using long sequences of numbers and/or characters to produce a process identifier. For example, in a unix or linux-based system, the "ps" command is a utility that will provide information about running processes in the system. However, the content that is displayed from this command may contain many screens of detailed information, which may not useable to the average administrator unless the administrator has enough detailed knowledge in his/her head to be able to correlate each of those processes to specific computer programs that may or may not be of interest to that administrator.

This problem is further exacerbated by the fact that the individual processes may pertain to execution and instances of various higher-level applications that operate on the system. For example, a database application may be running on the computer system, and one or more of the individual processes may pertain to instances of that database application. It would be very helpful to an administrator of the database system to be able to correlate processes with the individual database instances. However, because the conventional OS implementations do not have any native way to track such correlations for higher-level applications such as databases, this type of correlation is not possible today. This is problematic if the database administrator needs to be able to categorize processes as belonging to a given database (DB) instance in order to address a noisy neighbor problem where a first DB instance starves another DB instance of needed resources.

What is needed, therefore, is a method and/or system that overcomes these problems, and which more efficiently categorization of processes as database processes in a computing system.

SUMMARY

According to some embodiments, a system, method, and computer program product is that provides monitoring for process-based OS resource utilization by individual database instances in a multi-database environment.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

According to some embodiments, a system, method, and computer program product is provided that provides kernel-level monitoring for process-based OS resource utilization by individual database instances in a multi-database environment. This means that the computing resources used by processes can be identified for different database instances by directly monitoring at the level of the OS kernel.

Figure 1:
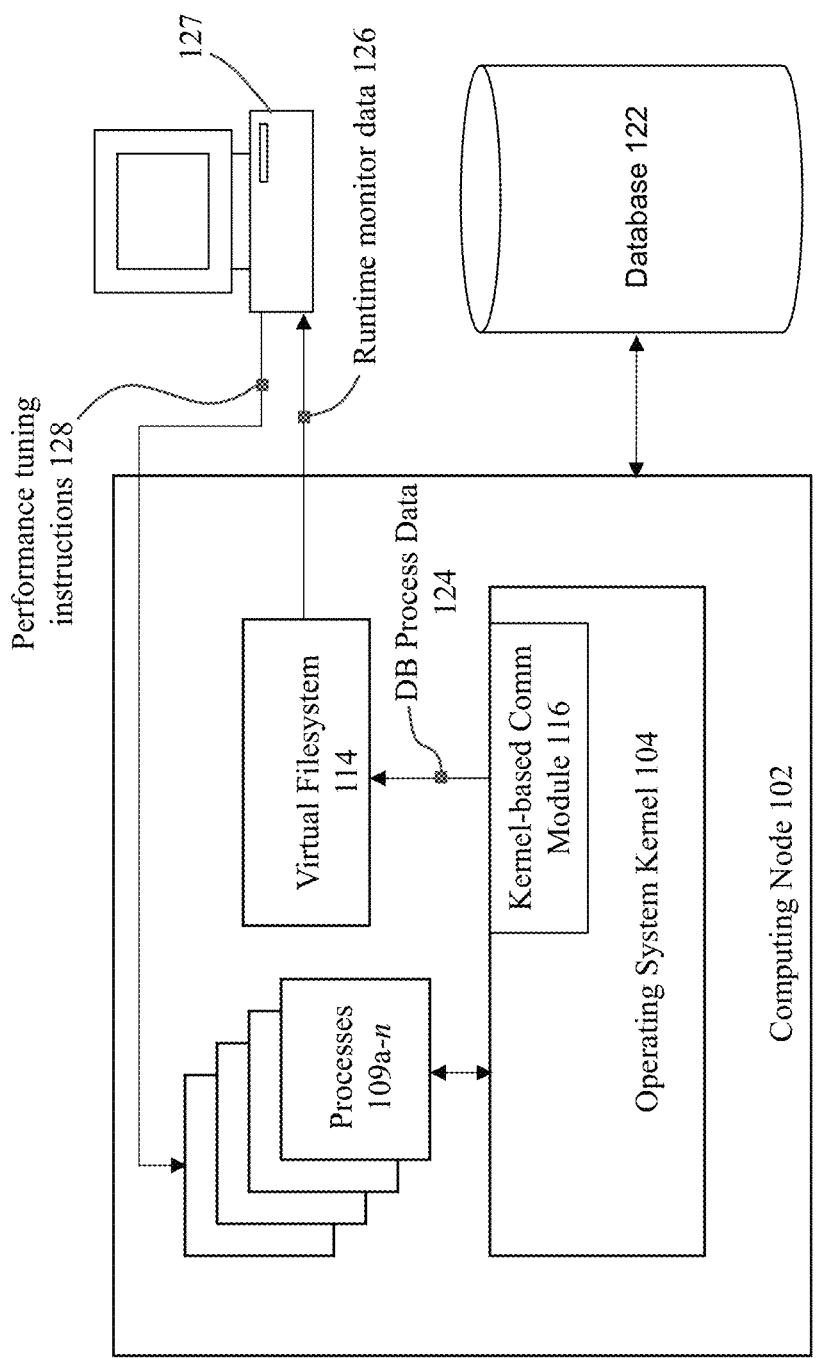
FIG. 1 illustrates a system to implement some embodiments of the invention.

FIG. 1 illustrates a system 100 to implement some embodiments of the invention. System 100 includes a database 122 having one or more database storage structures, which are embodied as one or more files on a physical storage device. For example, the database 122 may be created using the "CREATE DATABASE" command. Each database may be associated with one or more database tables, where the database table in a relational database is organized with data elements stored within a set of rows and columns, and each data element is stored within an intersection of a given row and a given column. The columns are defined according to a given schema to identify and/or define a set of attributes for a data item, with the one or more columns identifying respective attributes for the data item. Each row is typically used to store information for a separate data item, with attribute data for that data item stored within the appropriate column for that data item's row.

One or more database instances may be operating at computer node 102 to access and interoperate with database 122. Each database instance corresponds to an executable implementation of a running database, generally comprising memory structures that manage the database files within database 122. Each database instance is assigned a memory area to perform its operations, maintains internal data structures for its database-related processing, performs caching of data blocks from disk, performs logging, and/or implements SQL (structured query language) execution. With a single-instance database, one database instance operates with database 122. With a multiple-instance database (e.g., a cluster-based database system), multiple such database instances may be interoperating concurrently against the data files and log files within the database 122.

One or more processes 109a-n may be operating on the computing node 102, where at least some of the processes correspond to the one or more database instances. In particular, it is possible that some of the processes are associated with a first database instance while other processes are associated with a second database instance. Each of the processes consume some amount of the resources on the computing node 102 on behalf of its database instance.

The problem addressed by the present disclosure is to provide an efficient way to identify which of the processes correlate to specific database instances and to then monitor the resources consumed by those processes on a database instance basis. This type of correlation is very desirable to be able to identify and compare resource usage by the different database instances, so that resource consumption levels can be identified and to allow an administrator to better manage the relative consumption of resources by the different database instances.

One possible approach to address this problem is to require database instances themselves to keep to track of OS resources that they use, with that information made available within each database. In a system running multiple databases, agents can then be deployed to connect to each individual database to get its resource utilization, to collate the information for all databases, and then identify the database responsible for most OS utilization. With this approach, agents are deployed to gather this information from each database. The problem with this approach is that it relies upon the databases themselves to track their own resource consumption, and requires a non-OS related entity (i.e., the agent) to perform the data collection operations at a level higher than the OS. Moreover, the agent approach is a "heavyweight" approach that requires prior additional software installation and configuration to perform agent-based tracking of resources. Another possible approach is to take snapshots of OS statistics at specific intervals, calculate the incremental resource utilization per process and aggregate these statistics at the database level. The problem with the OS snapshot method is that this may result in relatively inaccurate information about the resource utilization, particularly if data is missed from processes that are stopped between when the snapshot data is collected, since the snapshots can only be taken for processes that are live when the snapshot is taken.

Embodiments of the invention provide an improved approach to perform process categorization and monitoring of database-related processes, where the operations are performed by direct interaction with the OS kernel 104. In particular, a virtual filesystem 114 is created that tracks the resource utilization of processes associated with database instances. One or more kernel-based communications modules 124 are employed to communicate with the kernel to identify and track processes associated with the database instance(s) and/or the database, and to provide DB process data 124 into the virtual filesystem 114.

This approach therefore allows for kernel-level database utilization monitoring, which very efficiently and accurately generates runtime DB monitoring data 126 to be provide to an administrator at a computing station 127. Based at least upon that monitoring data, the administrator may choose to provide tuning instructions 128 to more optimally allocate runtime resources among the different database instances and/or their processes.

Figure 2:
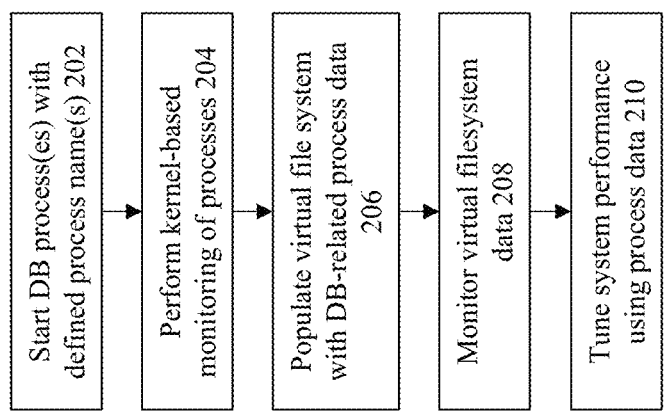
FIG. 2 shows a high-level flowchart of an approach to implement some embodiments of the invention.

FIG. 2 shows a high-level flowchart of an approach to implement some embodiments of the invention. At 202, one or more DB-related processes are started in the computing node. In some embodiments, the process names are assigned with a naming format/convention that include an identifier or name associated with a specific database instance. For example, the naming convention may append a database instance name to the end of a process name. This naming convention facilitates correlation of the processes to a specific database instance.

At 204, kernel-based monitoring is performed to track and/or monitor processes within the computing node. One or more kernel-based communications modules 124 (e.g., a "netlink" socket) can be employed to communicate with the kernel to identify and track processes associated with the database instance(s) and/or the database. Since the communications is at the kernel level, this avoids the need to utilize agents at the application level to query a database instance for performance information.

At 206, the DB process data 124 is used to populate the virtual filesystem 114. In some embodiments, the "cgroups" functionality of the Linux kernel can be leveraged to implement the virtual filesystem 114 and to track the OS resource usage. With cgroups, a set of process (e.g., those belonging to a particular database) are tagged together as a single group and the kernel aggregates the resource utilization of these processes belonging to the related cgroup. Since the aggregation of statistics is done by the kernel, no process is left out and the data is as accurate as possible. This approach therefore avoids the pitfalls of the snapshot approach, which may result in inaccurate information about the resource utilization for processes that are stopped between the snapshot data period.

At 208, the virtual filesystem is monitored, e.g., by monitoring performance related information for the DB-related processes. This step can be implemented, for example, by having a process read the data from the cgroup filesystem at specific time intervals.

From the performance information monitored from the virtual filesystem, at step 210, various optimizations may be performed within the computing node. For example, identification can be made of the relative OS resource utilizations by the various database instances on the computing node. This is helpful, for example, to diagnose noisy neighbor problems involving database instances that consume excessive amounts of computing resources. In addition, the system performance can be tuned to allocate more resources to certain database instances, while limiting resources allocated to other database instances. Moreover, service-level agreements (SLAs) can be accurately enforced by accurately identifying the resources consumed by the database instances.

Figure 3:
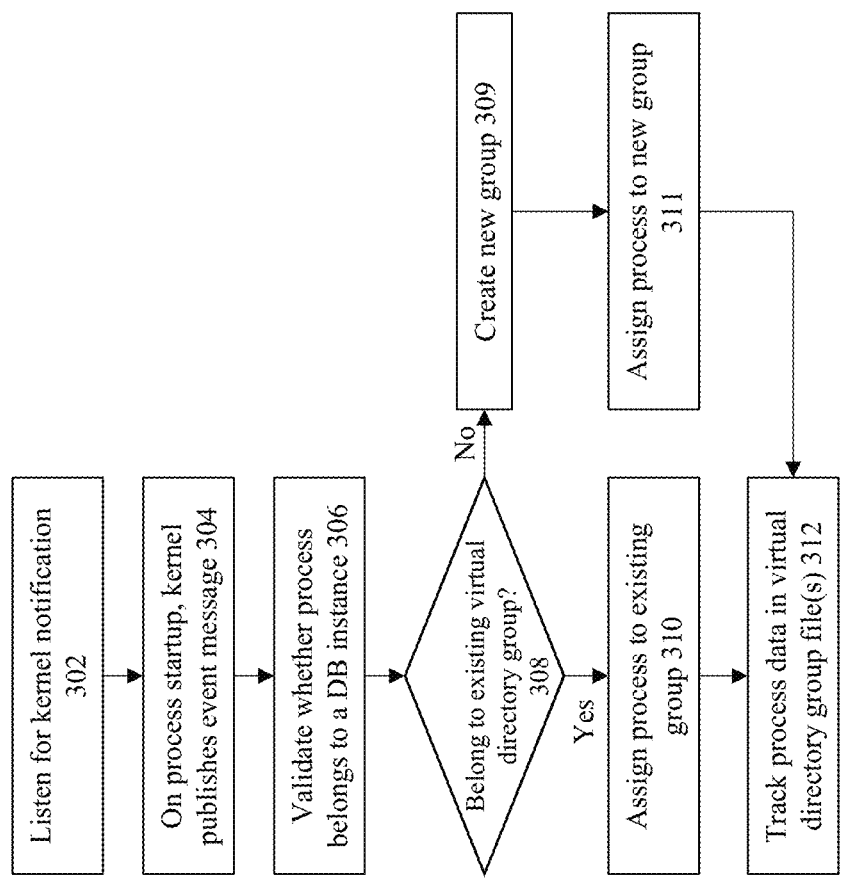
FIG. 3 shows a more detailed flowchart of an approach to perform kernel-level monitoring and categorization of database processes according to some embodiments.

FIG. 3 shows a more detailed flowchart of an approach to perform kernel-level monitoring and categorization of database processes according to some embodiments. At 302, listening is performed for kernel notifications. In some embodiments, a process (e.g., a background process) is initiated that listens to kernel events, e.g., to listen for process startup events. In particular, many kernels, such as linux-based kernels, publishes event notifications (e.g., proc_events) that contain information about the process startup. A netlink mechanism is employed in some embodiments to communicate with the kernel. "Netlink" refers to a socket mechanism within linux that provides an inter-process communications (IPC) interface to communicate between the kernel and userspace. This mechanism provides a full-duplex communication link between the two by way of socket APIs for user-space processes and a kernel API for kernel modules. Netlink socket uses the address family AF_NETLINK, as compared to AF_INET used by TCP/IP socket. Each netlink socket feature defines its own protocol type in the kernel header file include/linux/netlink.h. Therefore, to perform kernel-based communications and monitoring in some embodiments, a sockets-based interface is employed for communications between user space processes and an internal kernel API for kernel modules.

A kernel notification that is monitored, at 304, is an event message pertaining to a process startup. This allows kernel-based listening for the startup of any new processes. However, the process startup notification may pertain to all processes within the system, whether related to a database or not.

At 306, a validation action is performed to identify that the newly started process belongs to a database instance. The proc_event notification from the kernel will generally include various types of information about the newly started process. For example, the proc_event information will include the process identifier (PID) for the newly started process. The PID is then used as a lookup within the OS's process tables to identify the process name associated with that PID. As previously discussed, process naming conventions may be configured to include the database instance identifier/name as part of the name for a database-related process. Therefore, by looking up the process name for the PID, a scan of that process name for a database instance identifier/name can be performed to validate whether the process belongs to a database instance, and if so, to which database instance.

As previously noted, a virtual filesystem is employed in some embodiments to track the monitored performance information for database processes. In some embodiments, a control group ("cgroup") is employed to implement the virtual filesystem (cgroup virtual filesystem). A cgroup can be configured to include a collection of processes that are all associated with the same database instance. To replicate the filesystem concept, the cgroup for the related processes are established in a hierarchical manner, with a top level directory for the entire cgroup/database instance, and a subdirectory for each separate resource for the processes associated with the database instance. Within the cgroup, monitoring is performed upon the processes associated with the cgroup for each resource associated with a subdirectory. For example, resources such CPU, system memory, network bandwidth, IOPs, and/or combinations of these resources, may be allocated and/or assigned for the processes associated with a specific cgroup. The kernel aggregates resource utilization numbers for the processes associated with the cgroup. A cgroup subsystem and/or resource controller may be employed to manage and/or monitor specific resource(s) for the cgroup. For example, the cgroup may be associated with one or more of the following: (a) cpu; (b) cpuset; (c) cpuacct; (d) memory; (e) blkio; and/or (f) devices.

Once a process is validated as belonging to a database instance, a determination is made at 308 whether an existing virtual directory group (e.g., cgroup) already exists for that database instance. If so, then at 310, the process is tagged to the cgroup associated to the database instance. By tagging that process to a cgroup, the resource usage numbers associated with that process are included within the values collected within its associated cgroup. If the cgroup does not exist, then at 309, the cgroup for that database instance is created, and at 311, that process is assigned to the new group. The cgroup name could in some embodiments be the SID (service identifier) of the database. Thereafter, at 312, the process data for the tagged processes are monitored by the kernel and are included within the appropriate cgroup for that process.

Figure 4:
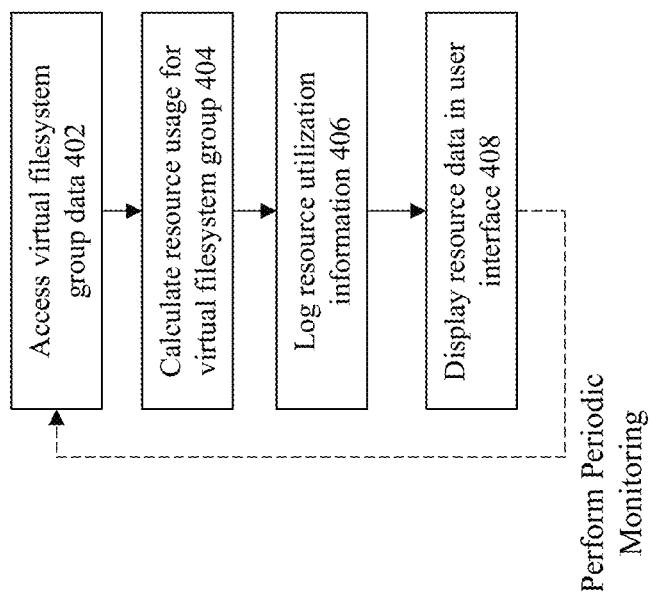
FIG. 4 shows a flowchart of an approach to implement monitoring of the cgroup/virtual filesystem according to some embodiments.

FIG. 4 shows a flowchart of an approach to implement monitoring of the cgroup/virtual filesystem according to some embodiments. Any suitable set of resources may be addressed according to some embodiments of the invention, such as CPU, TOPS, storage, and/or network usage.

At 402, the cgroup for a given database instance is accessed. The cgroup includes aggregated data for the different processes that are identified as belonging to the same database instance. Additional aggregations may be performed at different levels of granularity. For example, I/O activity may be tracked at the database instance level as discussed above. In addition, I/O can be tracked at the device level, at the granularity of a volume manager such as ASM (automatic storage management), or at the granularity of a disk group managed by a storage manager.

As each cgroup is associated with only one database instance, the cgroup data now provides resource utilization on a per database instance basis. At 404, resource usage for the cgroup can then be calculated. In some embodiments, the incremental resource usage is calculated as a difference between the current reading and the last reading. At 406, the calculated data can then be written into one or more log files. This information at appropriate location to maintain the history of resource utilization.

If required, then at 408, the data can also be presented on screen in a user interface to a user, e.g., an administrator of the database system. This process can be run continuously in the background to track and log the resource utilization. On a periodic or iterative basis, the above steps can repeated to provide continuous coverage and monitoring of the DB-related processes.

As noted above, the kernel provides access to multiple controllers (also referred to as subsystems) through the cgroup interface, such as for example, a memory controller for memory and a cpuacct controller for CPU usage. These controllers can be used to perform allocations and control over the use of these resources by processes associated with specific database instances. Therefore, an administrator can use the above techniques to monitor the cgroups that are configured, deny cgroups access to certain resources, and to configure/reconfigure the cgroups that are dynamically running on the system. This means that the administrator can use the above approach to implement fine-grained control over allocating, prioritizing, denying, managing, and monitoring system resources for processes associated with database instances. Hardware resources can be allocated and divided between the different database instances.

Figure 5A:
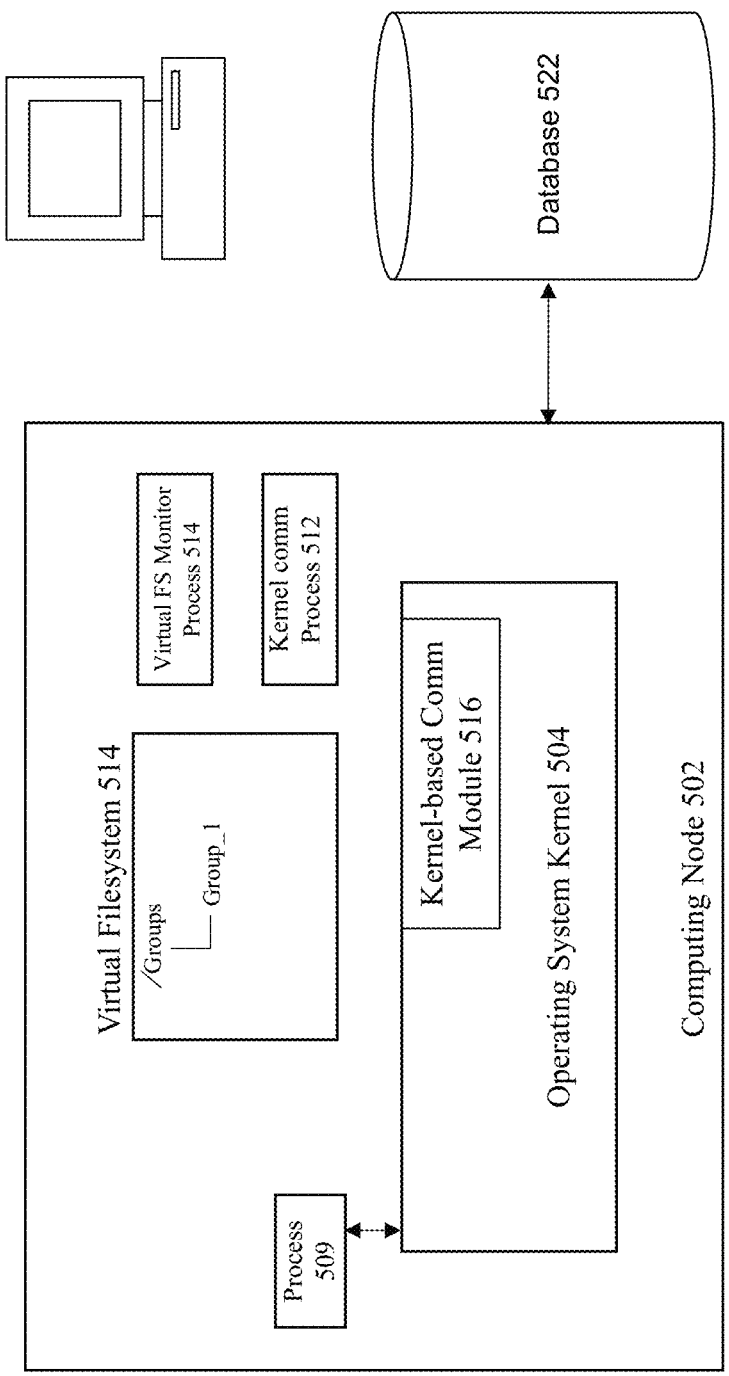
FIGS. 5A-5G provide an illustrative example of some embodiments of the invention.
Figure 5B:
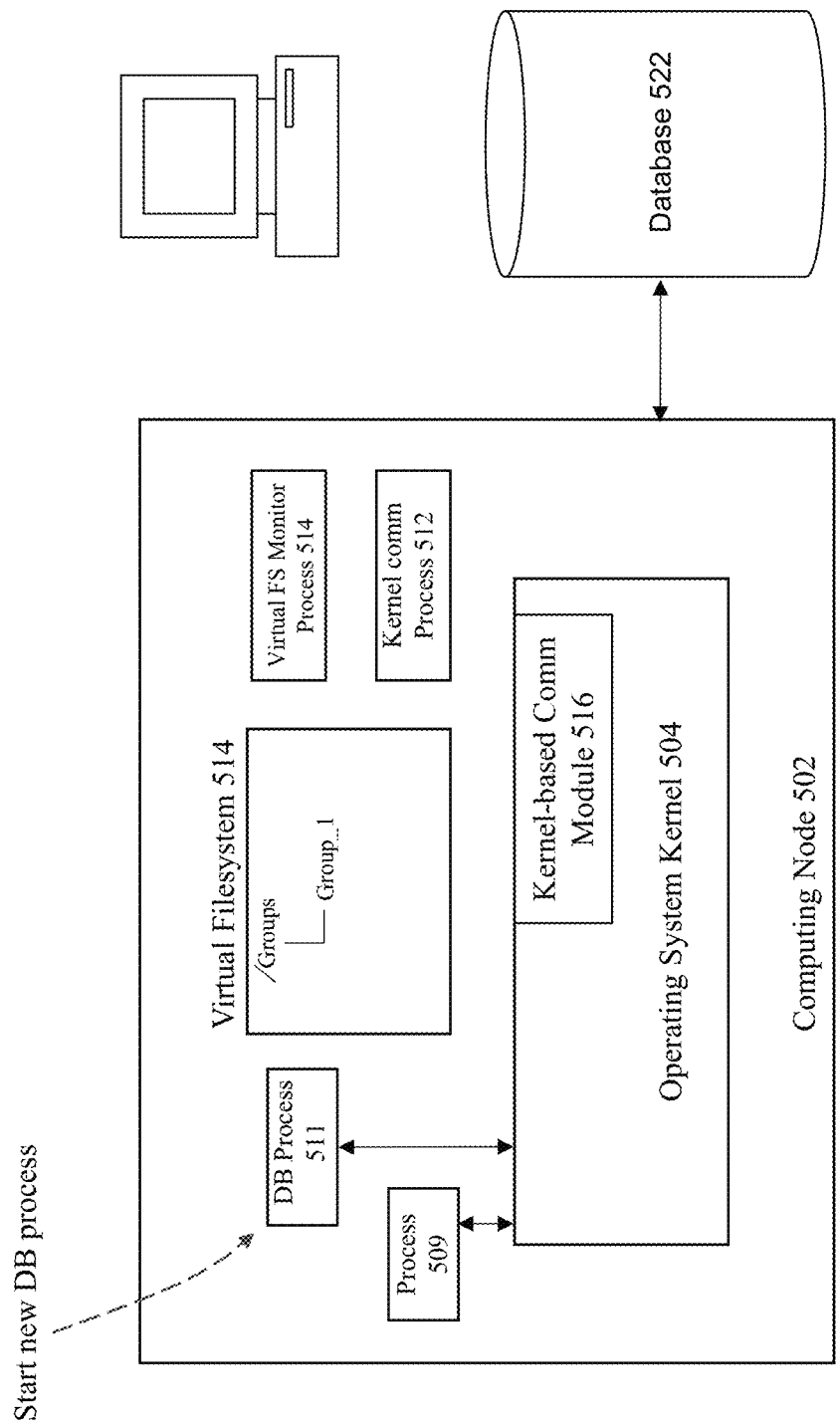

FIGS. 5A-5G provide an illustrative example of some embodiments of the invention. As illustrated in FIG. 5A, a computing node 502 is provided to execute work with respect to a database 522. For example, computing node 502 may operate one or more database instances to access and interoperate with the database 522. One or more processes may be started within the computing node to perform various tasks, such as process 509. Each database instance may be associated with one or more processes to execute work in the system on behalf of the database instance. For example, as shown in FIG. 5B, a newly started process 511 may have been started within the computing node 502 to execute tasks for a database instance.

Figure 5C:
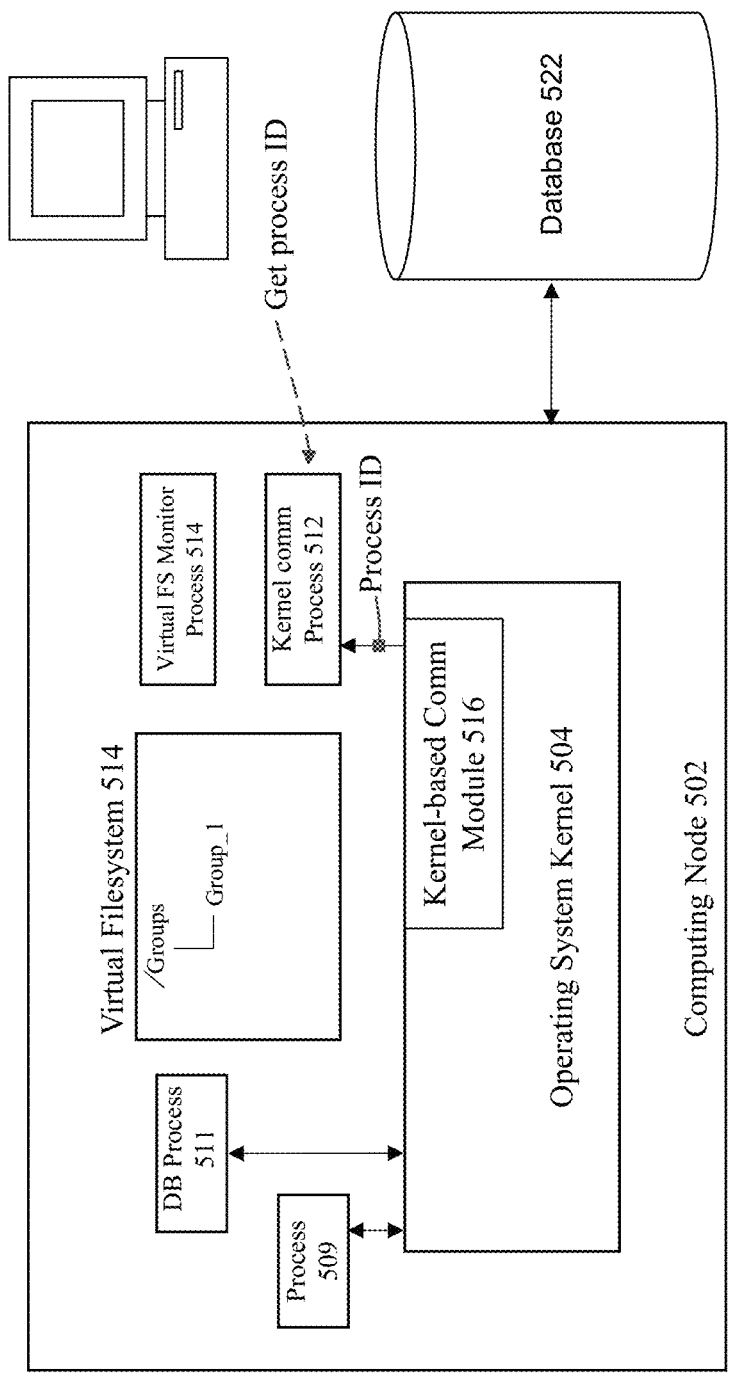

As illustrated in FIG. 5C, a process 512 may operate to receive notifications from the kernel 504 through kernel-based communications module 516. For example, the kernel-based communications module 516 may be implemented as a netlink socket within a linux-based kernel 504. Process 512 may operate to listen for proc-event notifications from the kernel 504, such as notification of the startup of process 511. This allows process 512 to receive the PID for the new process 511.

Figure 5D:
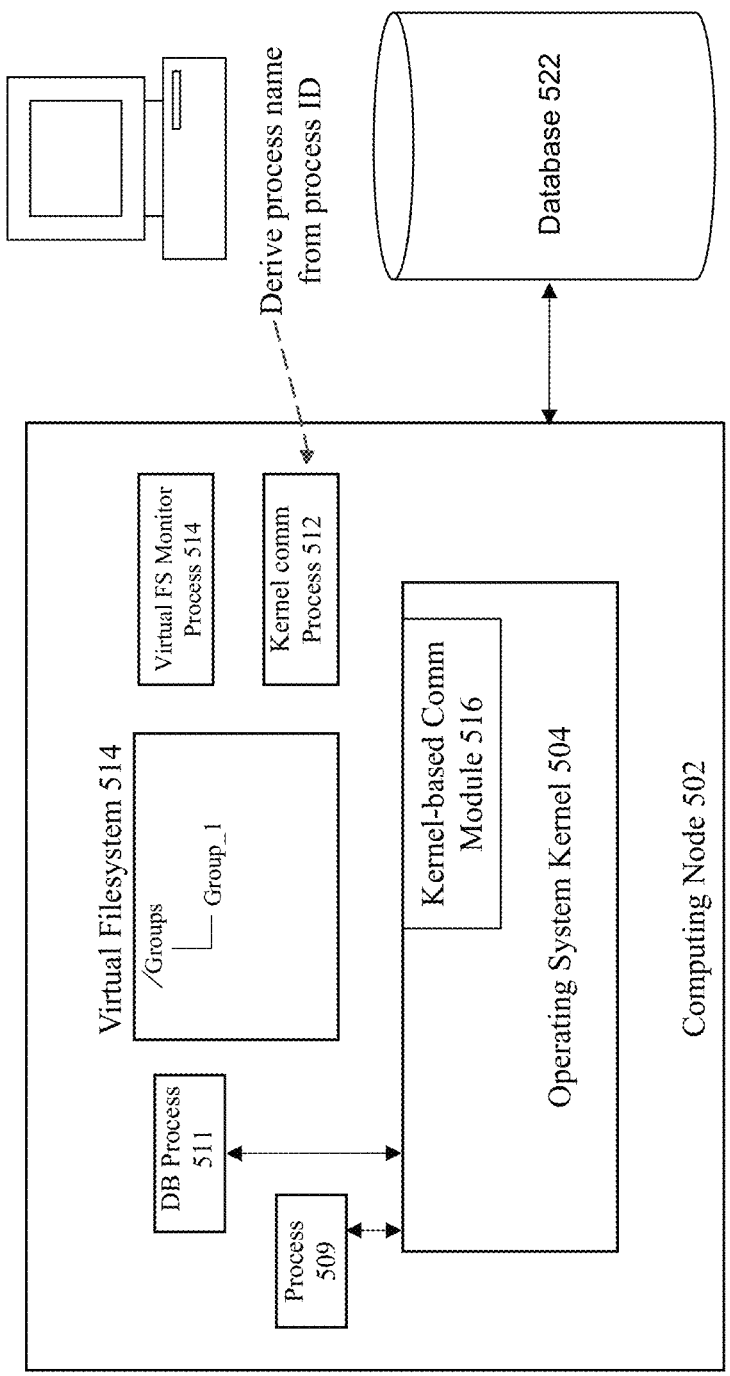

As illustrated in FIG. 5D, the process name for process 511 may be derived from the PID for process 511. This may be performed, for example, by performing a lookup within the computing node's process table(s) based upon the PID to identify the process name for process 511. Process naming conventions may be configured to include the database instance identifier/name as part of the name for a database-related process. By looking up the process name, this permits determination of whether the process belongs to a database instance. If so, then the identifier of the database instance within the process name also serves to identify the specific database instance associated with the process.

While this figure shows the same process 512 both listening for notifications from the kernel and performing the task of identifying the specific database instance corresponding to the process, it is noted that these operations may be performed by any number of one or more processes. For example, in one embodiment, a first process performs the operations to listen for notifications from the kernel, and a second process performs the operations to correlate PIDs to a given database instance.

Figure 5E:
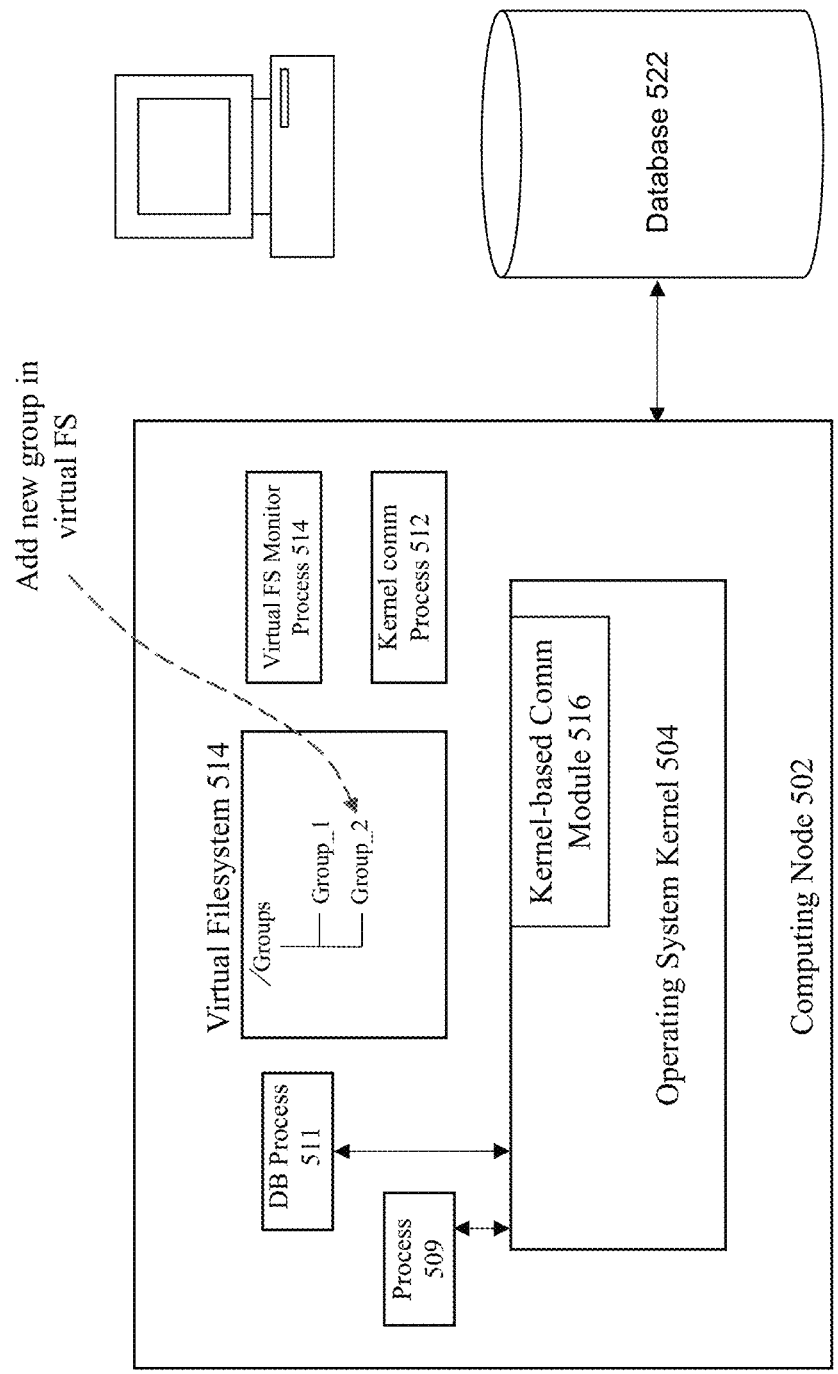

As illustrated within FIG. 5E, a cgroup may be created within virtual filesystem 514 for the database instance. In particular, "group_2" is shown as being created within the virtual filesystem 514 for the database instance associated with the new process 511. The new cgroup is configured to include the processes that are all associated with the same database instance.

Figure 5F:
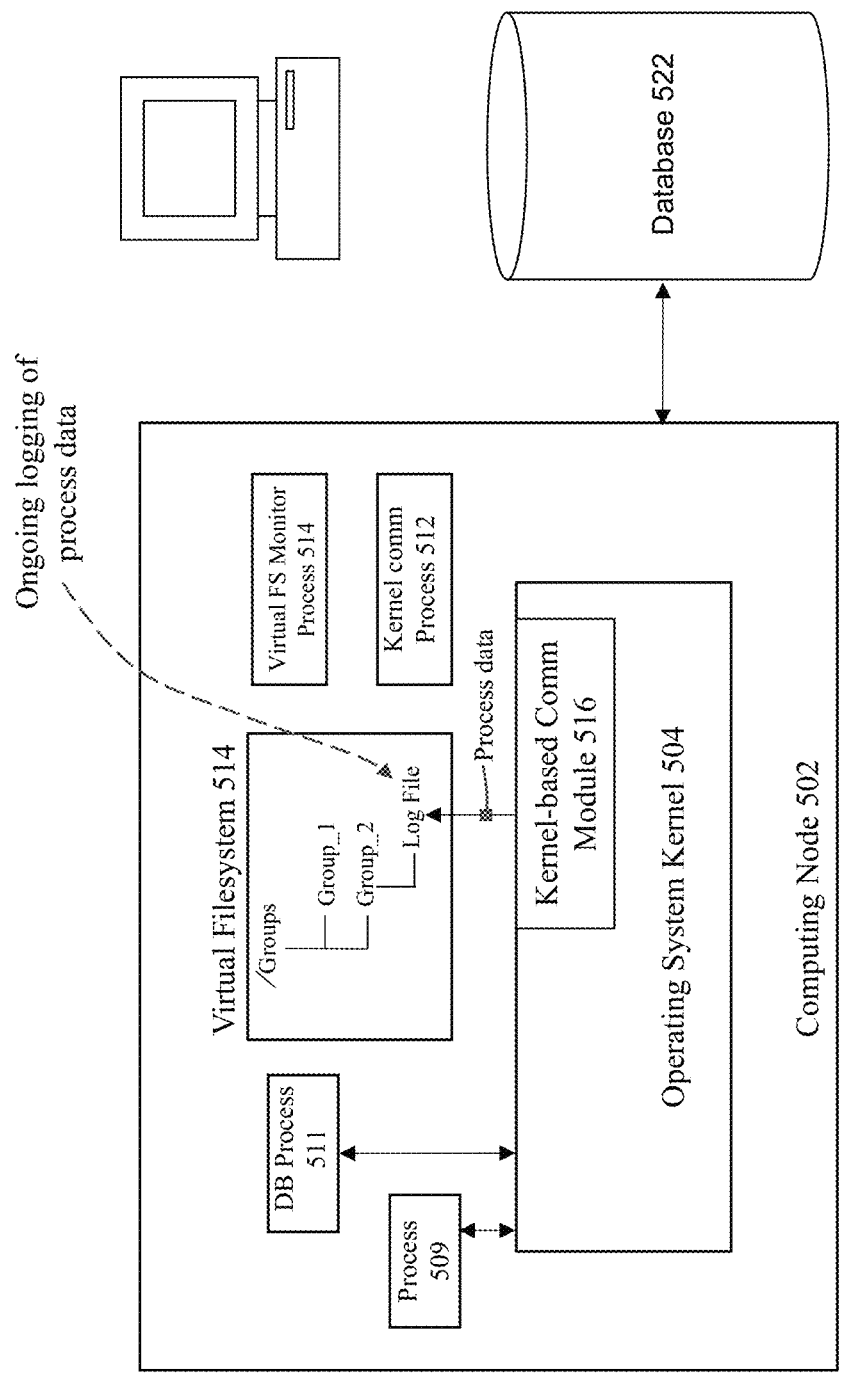
Figure 5G:
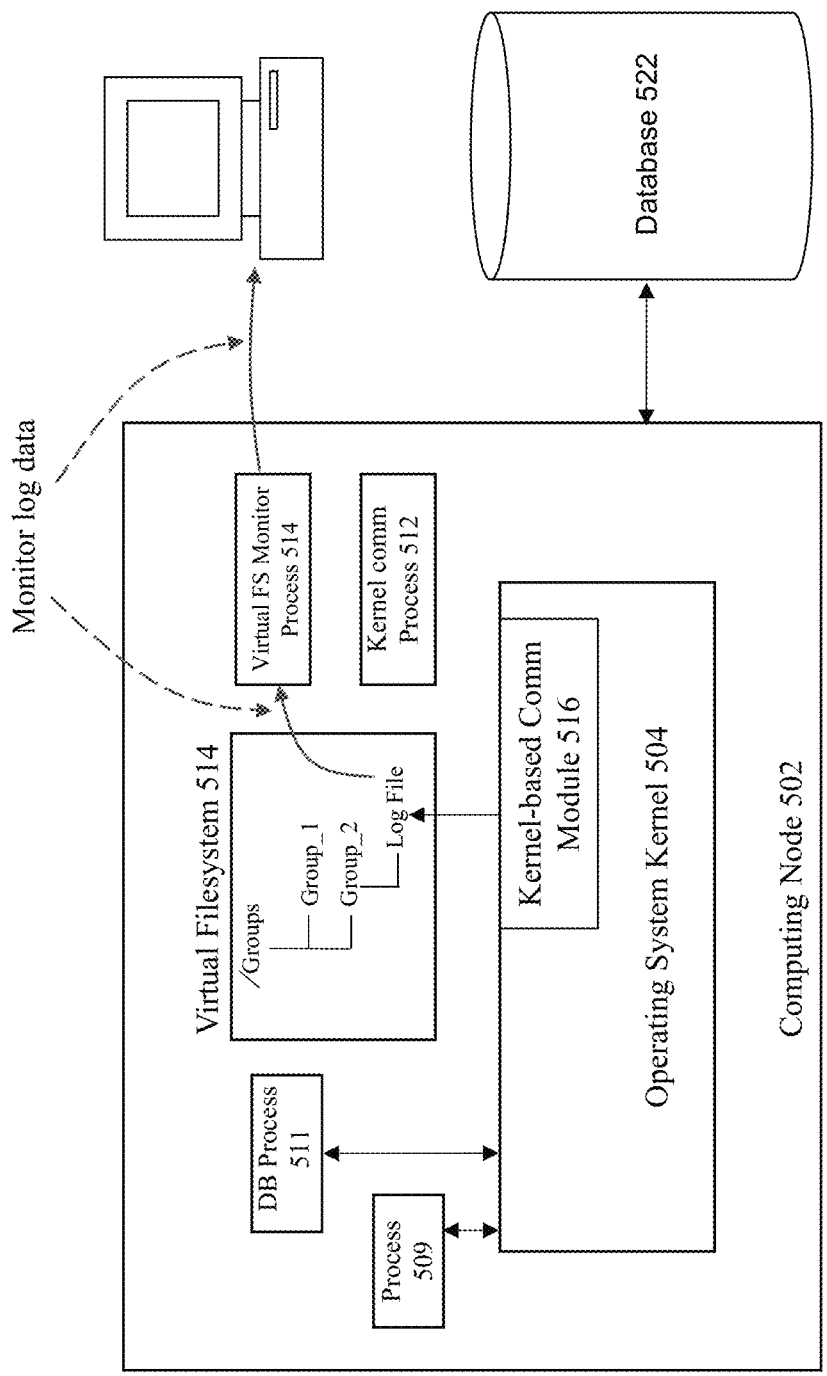

Within the cgroup, monitoring is performed upon the processes associated with the cgroup for each resource associated the processes for that database instance. For example, resources such CPU, system memory, network band idth, IOPs, and/or combinations of these resources, may be allocated and/or assigned for the processes associated with a specific cgroup. The kernel aggregates resource utilization numbers for the processes associated with the cgroup. As illustrated in FIG. 5F one or more logs may be created and placed into the cgroup to hold the aggregated resource utilization values for the processes associated with the database instance.

Thereafter, a process 514 may be employed to monitor the log data within the cgroup file(s). This may be implemented as a set of one or more manual operations performed by an administrator to view and monitor the log files within the appropriate directory within the cgroup(s). Alternatively, a user interface may be provided that provides one or more interface screens to view the log file(s) in an interactive mode, e.g., a first screen to view I/O information (e.g., IOPs or input/output operations per second information) and/or a second screen to view networking resource information (e.g., Mbps or megabit per second information).

Therefore, what has been provided is an improved approach to implement a system, method, and computer program product to perform monitoring for process-based OS resource utilization by individual database instances in a multi-database environment. This approach may be used to resolve numerous resource allocation and monitoring problems, especially in today's world of consolidation where issues such as the noisy neighbor problem is one of most critical areas. In a multi-database environment, one database can use up all the OS resources leaving other databases constrained. This method provides a very efficient and effective way to track database utilization of OS resources with dynamic aggregation mechanism. This approach provides real-time data for administrators to quickly identify the database that consume excessive OS resources, and which can be used to address the noisy neighbor problem.

System Architecture Overview

Figure 6:
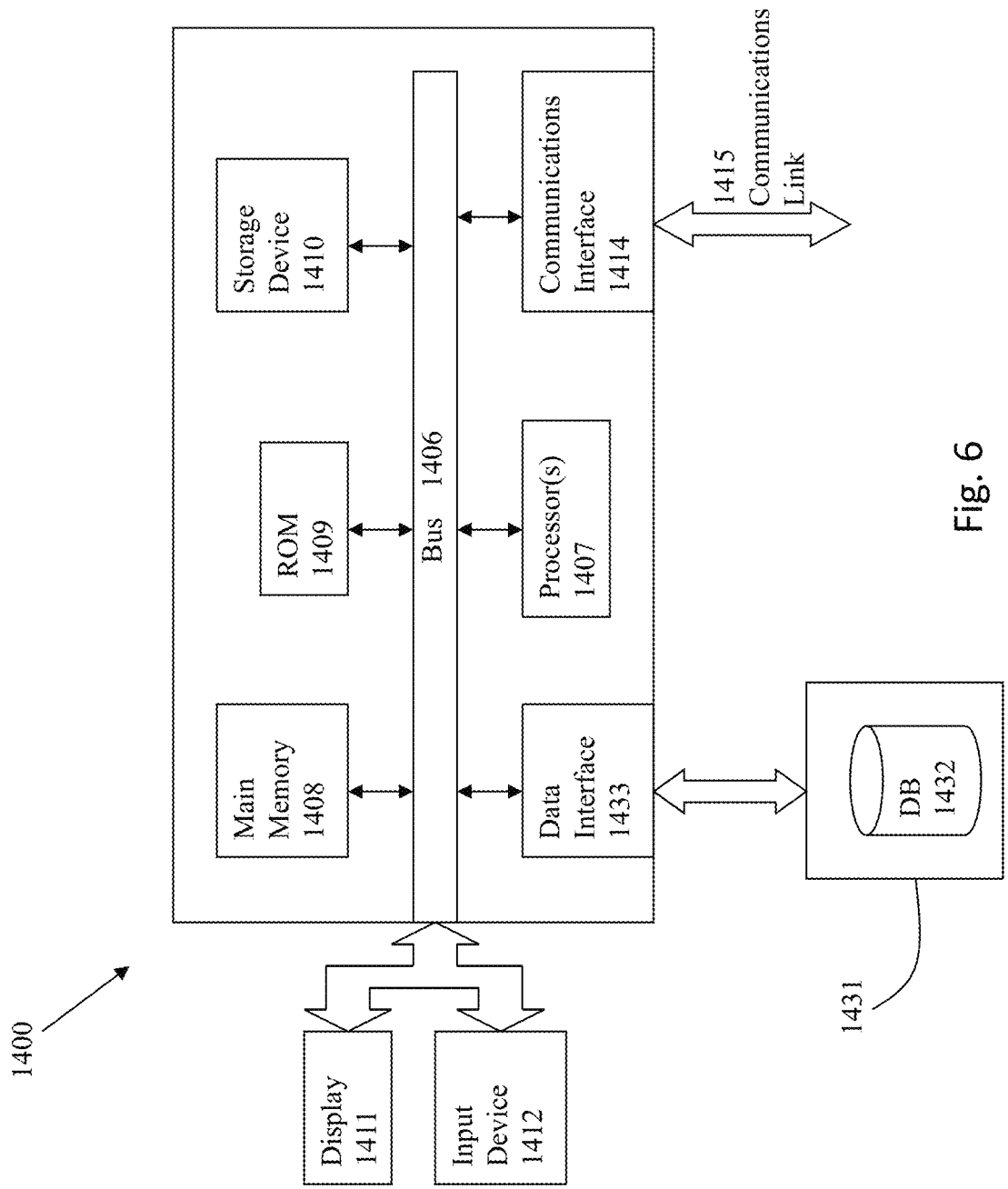
FIG. 6 is a block diagram of an illustrative computing system suitable for implementing an embodiment of the present invention.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 7:
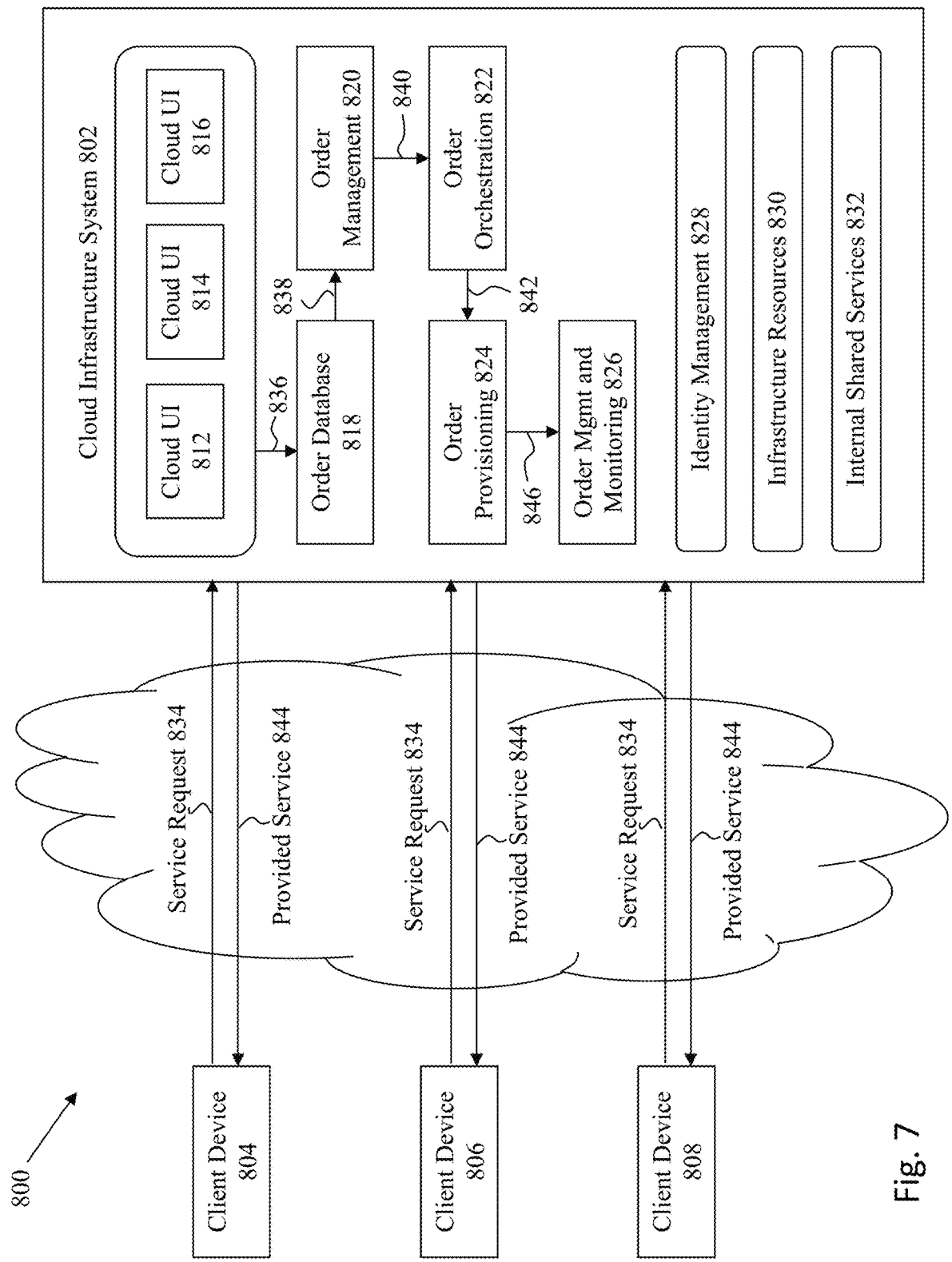
FIG. 7 is a block diagram of one or more components of a system environment in which services may be offered as cloud services, in accordance with an embodiment of the present invention.

FIG. 7 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 6. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
listening for a process event notification from a kernel of an operating system;
identifying, from the process event notification, a database instance corresponding to a process;
creating, within a virtual file system, a subdirectory for the database instance, wherein the subdirectory maintains resource utilization data for processes of the database instance, and resource utilization data for different respective database instances are maintained in different respective subdirectories; and
updating a log file within the subdirectory to represent the resource utilization of the process; and
reallocating computing resources for the process based at least upon the resource utilization data.

2. The method of claim 1, wherein the process is associated with a process name, and the process name comprises an identifier for the database instance, such that the database instance associated with the process is identified by determining a presence of the identifier for the database instance in the process name.

3. The method of claim 2, further comprising determining the process name from a process ID for the process.

4. The method of claim 1, further comprising using a netlink socket to listen for the process event notification from the kernel.

5. The method of claim 1, wherein the subdirectory corresponds to a cgroup.

6. The method of claim 5, further comprising using a cgroup subsystem to monitor the resource utilization data for the cgroup.

7. The method of claim 1, wherein the resource utilization data corresponds to at least one of CPU, I/O, storage, memory, or network usage.

8. The method of claim 1, further comprising aggregating the resource utilization data for multiple processes associated with the database instance.

9. A computer program product embodied on a non-transitory computer readable medium, the computer readable medium having stored thereon a sequence of instructions which, when executed by a processor, executes:
listening for a process event notification from a kernel of an operating system;
identifying, from the process event notification, a database instance corresponding to a process;
creating, within a virtual file system, a subdirectory for the database instance, wherein the subdirectory maintains resource utilization data for processes of the database instance, and resource utilization data for different respective database instances are maintained in different respective subdirectories; and updating a log file within the subdirectory to represent the resource utilization of the process; and reallocating computing resources for the process based at least upon the resource utilization data.

10. The method of claim 1, wherein a first database instance is associated with a first subdirectory and a second database instance is associated with a second subdirectory.

11. A system for implementing high-volume ingestion of data into a relational database system, comprising:
a processor;
a memory for holding program code; and
wherein the program code includes instructions for listening for a process event notification from a kernel of an operating system; identifying, from the process event notification, a database instance corresponding to a process; creating, within a virtual file system, a subdirectory for the database instance, wherein the subdirectory maintains resource utilization data for processes of the database instance, and resource utilization data for different respective database instances are maintained in different respective subdirectories; updating a log file within the subdirectory to represent the resource utilization of the process; and reallocating computing resources for the process based at least upon the resource utilization data.

12. The system of claim 11, wherein the process is associated with a process name, and the process name comprises an identifier for the database instance, such that the database instance associated with the process is identified by determining a presence of the identifier for the database instance in the process name.

13. The system of claim 12, wherein the program code further includes instructions for determining the process name from a process ID for the process.

14. The system of claim 11, wherein the program code further includes instructions for using a netlink socket to listen for the process event notification from the kernel.

15. The system of claim 11, wherein the subdirectory corresponds to a cgroup.

16. The system of claim 15, wherein the program code further includes instructions for using a cgroup subsystem to monitor the resource utilization data for the cgroup.

17. The system of claim 11, wherein the program code further includes instructions for aggregating the resource utilization data for multiple processes associated with the database instance.

18. The system of claim 11, wherein the resource utilization data corresponds to at least one of CPU, I/O, storage, memory, or network usage, and a first database instance is associated with a first subdirectory and a second database instance is associated with a second subdirectory.

19. The computer program product of claim 9, wherein the resource utilization data corresponds to at least one of CPU, I/O, storage, memory, or network usage.

20. The computer program product of claim 9, wherein the process is associated with a process name, and the process name comprises an identifier for the database instance, such that the database instance associated with the process is identified by determining a presence of the identifier for the database instance in the process name.

21. The computer program product of claim 20, wherein the sequence of instruction, when executed by the processor, further executes determining the process name from a process ID for the process.

22. The computer program product of claim 9, wherein the sequence of instruction, when executed by the processor, further executes using a netlink socket to listen for the process event notification from the kernel.

23. The computer program product of claim 9, wherein the subdirectory corresponds to a cgroup.

24. The computer program product of claim 23, wherein the sequence of instruction, when executed by the processor, further executes using a cgroup subsystem to monitor the resource utilization data for the cgroup.

25. The computer program product of claim 9, wherein the sequence of instruction, when executed by the processor, further executes aggregating the resource utilization data for multiple processes associated with the database instance.

26. The computer program product of claim 9, wherein a first database instance is associated with a first subdirectory and a second database instance is associated with a second subdirectory.

* * * * *

UNITED STATES PATENT AND TRADEMARK OFFICE
CERTIFICATE OF CORRECTION

PATENT NO. : 11,138,040 B2
APPLICATION NO. : 16/352158
DATED : October 5, 2021
INVENTOR(S) : Athmanathan et al.

Page 1 of 1

It is certified that error appears in the above-identified patent and that said Letters Patent is hereby corrected as shown below:

On the Title Page

On page 2, Column 2, under Other Publications, Line 2, delete "https://does." and insert -- https://docs. --, therefor.

On page 2, Column 2, under Other Publications, Line 6, delete "https://does." and insert -- https://docs. --, therefor.

In the Specification

In Column 8, Line 12, delete "band idth," and insert -- bandwidth, --, therefor.

In Column 8, Line 16, delete "5F" and insert -- 5F, --, therefor.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*